US008029883B2

(12) United States Patent
Xu et al.

(10) Patent No.: US 8,029,883 B2
(45) Date of Patent: Oct. 4, 2011

(54) IMAGE RECEIVER MEDIA AND PRINTING PROCESS

(76) Inventors: Ming Xu, Malvern, PA (US); Zhenrong Guo, Mt. Pleasant, SC (US); Sukun Zhang, Mt Pleasant, SC (US)

( * ) Notice: Subject to any disclaimer, the term of this patent is extended or adjusted under 35 U.S.C. 154(b) by 0 days.

(21) Appl. No.: 12/613,084

(22) Filed: Nov. 5, 2009

(65) Prior Publication Data

US 2010/0129572 A1 May 27, 2010

Related U.S. Application Data

(60) Provisional application No. 61/161,913, filed on Mar. 20, 2009, provisional application No. 61/120,175, filed on Dec. 5, 2008, provisional application No. 61/117,752, filed on Nov. 25, 2008.

(51) Int. Cl.

| | |
|---|---|
| ***B32B 3/00*** | (2006.01) |
| ***B32B 5/16*** | (2006.01) |
| ***B32B 7/00*** | (2006.01) |

(52) U.S. Cl. .................... 428/206; 428/207; 428/211.1; 428/325; 428/688

(58) Field of Classification Search .................. 428/206, 428/207, 211.1, 325, 688

See application file for complete search history.

(56) References Cited

U.S. PATENT DOCUMENTS

| | | | | |
|---|---|---|---|---|
| 7,709,417 | B2 | 5/2010 | Yukawa | |
| 2001/0040593 | A1 | 11/2001 | Horiuchi | |
| 2005/0068407 | A1 | 3/2005 | Watanabe et al. | |
| 2005/0148469 | A1 | 7/2005 | Yukawa et al. | |
| 2005/0208297 | A1 | 9/2005 | Hirota et al. | |
| 2006/0198971 | A1 | 9/2006 | Obonai et al. | |
| 2007/0181253 | A1 * | 8/2007 | Xu et al. | 156/344 |

FOREIGN PATENT DOCUMENTS

| | | | |
|---|---|---|---|
| EP | 1285773 | A1 | 2/2003 |

* cited by examiner

*Primary Examiner* — Betelhem Shewareged

(74) *Attorney, Agent, or Firm* — B. Craig Killough

(57) ABSTRACT

A transfer medium is provided for receiving images formed on the medium by inks or toners comprising thermally diffusible colorants, including disperse dye and sublimation dye, and methods of using the medium to present images on substrates. The medium provides an opaque layer that allows transfer of the image from the medium to a substrate, and provides a background for the image when the image is transferred to a dark colored substrate, so that the dark colored substrate does not obscure the image.

15 Claims, 2 Drawing Sheets

IMAGE RECEIVER MEDIA AND PRINTING PROCESS

Applicant claims the benefit of the following U.S. Provisional Applications: U.S. Provisional Application Ser. No. 61/117,752 filed Nov. 25, 2008; U.S. Provisional Application Ser. No. 61/120,175 filed Dec. 5, 2008; and U.S. Provisional Application Ser. No. 61/161,913 filed Mar. 20, 2009.

FIELD OF THE INVENTION

This invention relates to a transfer medium generally, and is more specifically directed to a multiple-layered medium which receives a printed image. The printed image is transferred from the transfer medium to a dark colored substrate.

BACKGROUND OF THE INVENTION

Transfer printing processes involve physically transferring an image from one substrate to another. Transfer media are receivers for print media from which an image is subsequently transferred. Transfer media are commonly rectangular sheets in sizes such as A and A4 upon which one or more materials are coated. The transfer media may include a release layer that encourages release of the image to the substrate during transfer. The materials coated on the transfer media may be binder materials that bond the image to the final substrate upon which the image is to appear, which may be a textile.

Sublimation transfer technologies are widely used in digital printing applications. However, these applications are limited to substrates that comprise a synthetic component, such as polyester materials. Due to the characteristics of the sublimation colorants, full color sublimation transfer technology has been mainly used for white or pastel substrates. Furthermore, sublimation printing process requires relatively low to medium energy sublimation colorants, and fastness properties, especially light fastness, have been an issue for these applications.

Attempts have been made to print images on dark substrates, such as dark colored textile materials. For instance, peelable white transfer papers have been used in combination of sublimation inks. This method requires a relatively thick coating structure in order to allow mechanical separations of transfer film from supporting paper. Such a thick structure creates a heavy, and undesirable, 'hand' on textile substrates. In addition, film peeled from a supporting paper after imaging the film becomes dimensionally unstable, resulting in image distortion.

Sublimation printing with other forms of white transfer paper has also been used in dark fabric material printing. However, the heavy use of white pigment in the transfer layers, with the binders having high affinity to sublimation dyes, yields poor penetration and transfer efficiency, as well as low image resolution by large dot-gain, making the final product undesirable for apparel and delicate textiles when high quality or photographic quality images are required. The spread of sublimation dyes through the entire pigmented layers consumes unnecessary amount of colorants.

SUMMARY OF THE INVENTION

The present invention is directed to a novel transfer medium for use with images formed on the medium by inks or toners comprising thermally diffusible colorants, including disperse dye and sublimation dye, and methods of using the medium to present images on substrates. The medium provides an opaque layer that allows transfer of the image from the medium to a dark substrate, and provides a background for the image when the image is transferred to a dark colored substrate, so that the dark colored substrate does not obscure the image. An object of the current invention is to create a heat transfer printing medium, and a method using the transfer medium for dark substrate imaging, with color images printed over a white or similarly light colored background.

Thermally diffuse colorants, such as disperse and sublimation dyes, including high light fastness disperse dyes, may be used. The colorants are printed or applied on one side of the transfer medium, and upon transfer, thermally diffuse and migrate through an opaque layer, for which the colorants have no material affinity, that is, the colorants have no, or low affinity, for the opaque layer, and the will form a satisfactory image over the opaque layer upon transfer. Upon transfer of the image, the dyes affix to a polymeric layer or layers to which the dyes have high affinity. These polymeric layers are positioned opposite the image layer as the image layer is printed or applied the medium, and upon transfer to the final substrate, are present on the outer surface of the final substrate.

DESCRIPTIONS OF PREFERRED EMBODIMENTS

Figure 1:
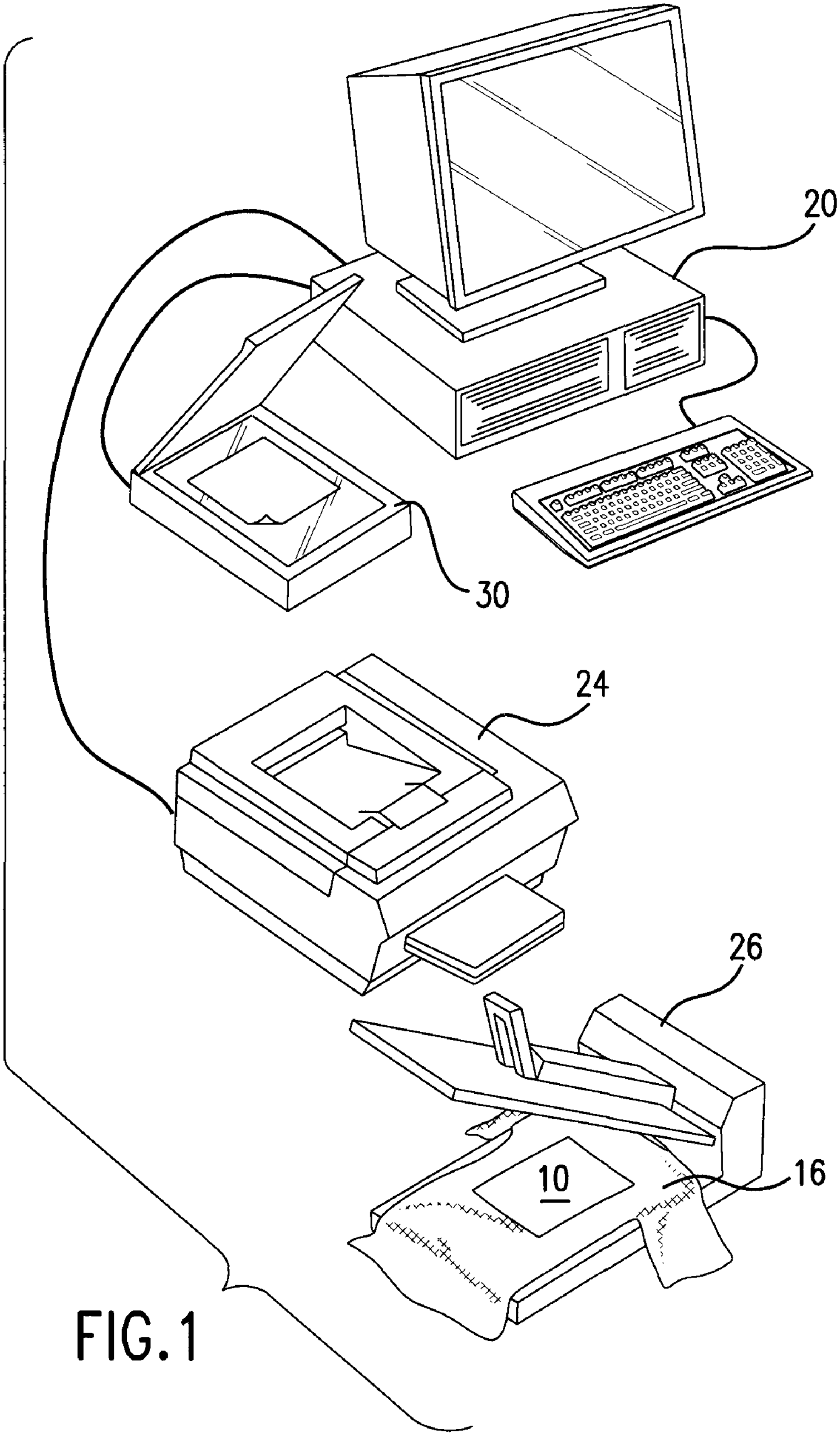
FIG. 1 demonstrates a preferred process of digitally printing and transferring an image according to the invention.
Figure 2:
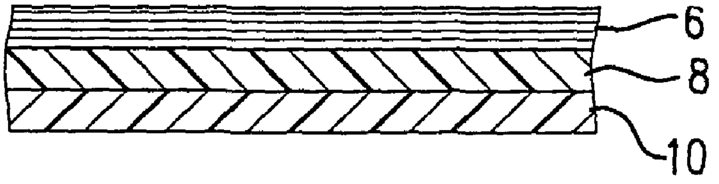
FIG. 2 demonstrates layers of an embodiment of the transfer medium of the present invention.

In one embodiment of the present invention, a transfer medium comprises a releasing base sheet 10, a clear polymer layer 8, which has a strong affinity for thermally diffusible colorants according to the invention, and a permeable opaque layer 6 containing an opacifying agent, such as white pigment. FIG. 2.

Figure 3:
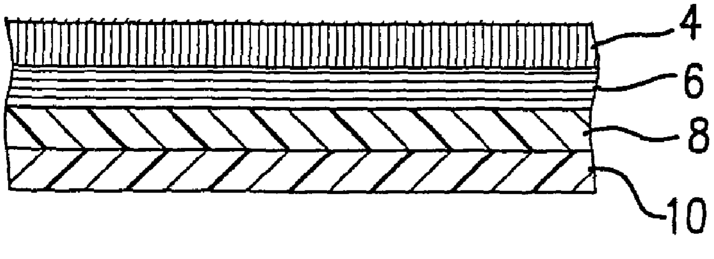
FIG. 3 demonstrates layers of another embodiment of the transfer medium of the present invention.

In another embodiment of the present invention, the transfer medium comprises a releasing base sheet 10, a clear polymer layer 8, which has a strong affinity for thermally diffusible colorants, a permeable opaque layer 6 containing an opacifying agent, such as white pigment, and an ink or toner receptive layer 4. FIG. 3. The ink may be a liquid ink, such as an ink jet ink described in Hale et al, U.S. Pat. No. 5,488,907.

In yet another embodiment of the present invention, after an image is printed or otherwise applied on a transfer medium, the portion of the transfer medium that is covered with binders or other materials, but is not imaged, is printed with a resist layer. Upon application of heat and/or pressure to the back of the transfer medium, the binder materials that are present on the transfer medium and are not covered with an image are not transferred to the final substrate, since the resist layer prevents substantial transfer, or bonding of these materials, to the final substrate. A resist layer may be formed as described in U.S. Pat. No. 6,540,345 and Xu, et al, U.S. patent application Ser. No. 11/413,734 filed Apr. 28, 2006, the teachings of which are incorporated herein by reference.

An image is printed on the medium opposite the base sheet. The image may be printed by a digital printer, such as a computer 20 driven ink jet printer 24. After the image is printed on the medium, with or without the resist layer applied, the image is ready for transfer from the medium to the final substrate.

Heat may be applied from the back, or base sheet 10, of the transfer medium, with intimate contact of the medium with the final substrate, and preferably under pressure, to transfer the image from the transfer medium to a final substrate. The heat may simultaneously activate the image, and/or react components and bond and/or cross-link the final substrate and the colorants. The image is bonded to the substrate, and excellent durability and fastness properties can be achieved for the final design image that appears on the final substrate. Appropriate pressure is applied during the transfer process to ensure the proper surface contact between the medium and the final substrate. Vacuum may be applied through the transfer process to further assist the transfer efficiency.

The release base sheet 10 preferably provides a surface that will promote release of, or peeling away of, layers coated thereon upon transfer to a substrate. The release base sheet may be a nonwoven cellulosic sheet or polymer films such as polyolefin, or polyester film, for example, and will preferably be an acrylic or silicone coated releasing paper or film.

The clear polymer layer 8 in one embodiment is a polymer layer, which has high affinity to the thermally diffusible colorants used in the ink or toner to generate images. One example is polyester, which is an excellent receptor for disperse and sublimation dyes. In order to achieve flexibility of the final image and soft hand, the overall glass transition temperature of the polymeric material(s), Tg, is preferably −20° C. to 100° C. The polymer may be polyester, polyamide, acrylic/acrylate, nylon, or other receptive polymer with high affinity to thermally diffusible colorants, or a combination thereof. The polymers may be a mixture of cross-linkable polymers. For example, a blocked polyisocyanate and a hydroxyl-functionalized polyester resin may be combined with a hot melt adhesive to form polymer layer 8. Upon application of heat during the transfer process, the polyisocyanate and hydroxyl-functionalized polyester cross-link to form a permanently bonded color image on the substrate. The polymer layer 8 may be applied to the release base sheet 10 by known methods such as aqueous-based coating, solvent-based coating, hot melt coating, extruded, transfer coating, or lamination. The dry coat weight of the polymer layer 8 may range from 5-60 g/m2, and is preferably 10-30 g/m2.

Example of Polymer Layer 8:

| | |
|---|---|
| Rucote ® thermosetting polyester resin | 0-50% |
| Hot melt adhesive | 0-50% |
| Rhodocoat WT-1000 blocked polyisocyanate | 0-15% |
| Coating Additives | 0-20% |

The permeable opaque layer 6 comprises an opacifying agent or agents and suitable polymer binders. Preferable opacifying agents are white pigments, such as titanium dioxide, calcium carbonate, aluminum oxide, or zinc oxide, or combination thereof. Organic white colorants may also be used. Preferably, the opacifying agent or agents comprise 20-30% of the permeation opaque layer. The dry coat weight generally ranges from 5-60 g/$m^2$, and is preferably 10-45 g/$m^2$.

The opaque layer may act as a binder. This layer is preferred to have little to no affinity for thermally diffusible or sublimation colorants that are preferred to be used with the invention. In one embodiment, the image layer comprising the diffusible or sublimation colorants is printed on the opaque layer 6. An object of the invention is to prepare a transfer medium that allows printing with a disperse dye ink or toner. Upon heat transfer to a substrate, the disperse dye diffuses and migrates through the permeable opaque layer 6 and into the polymer layer 8 with little to no retention of the dye by the opaque layer or layers though which the colorant diffuses and passes. Preferred materials for the permeable opaque layer are materials that bind the opaque layer to the substrate Examples are, but are not limited to, cellulose and chemically modified cellulose, low density polyethylene, chlorinated polyethylene, polyvinyl chloride, polysulfone, polystyrene or crosslinked polystyrene, melamine/formaldehyde resin, phenol/formaldehyde resin, fluorinated polymers, siloxane and/or modified siloxane polymer materials, copolymers such as polytetrafluoroethylene, and polyvinylidene fluoride. Low molecular weight emulsion polymers, such as polyvinyl alcohol, polyvinyl acetate, or silicon based elastomers may be used. The polymer binders may have aliphatic structures without polyester functionality, which have no or low affinity for thermally diffusible colorants than aromatic polymer binders, allowing low colorant retention, high permeability and colorant diffusing/migration efficiency, and high image color density upon transfer to the substrate. The polymer binders may be cross-linkable.

To further enhance the permeability of the permeable opaque layer, additives such as a foaming/blowing agent or agents may be added. These foaming/blowing agent chemicals generate micropores during the heat transfer process through the opaque layer further allowing the diffusion and migration of the colorants through the opaque layer to the clear polymer layer.

Preferable foaming agents include those which decompose upon heating to release a gas or gases, which cause the ink layer to expand. Such foaming agents, known as chemical blowing agents or puffing agents include organic expanding agents such as azo compounds, including azobisisobutyronitrile, azodicarbonamide, and diazoaminobenzene, nitroso compounds such as N,N'-dinitrosopentamethylenetetramine, N,N'-dinitroso-N,N'-dimethylterephthalamide, sulfonyl hydrazides such as benzenesulfonyl hydrazide, p-toluenesulfonyl hydrazide, p-toluenesulfonyl azide, hydrazolcarbonamide, acetone-p-sulfonyl hydrazone; and inorganic expanding agents, such as sodium bicarbonate, ammonium carbonate and ammonium bicarbonate azodicarbonamide.

For soft hand and flexibility of the image area after heat transfer, the permeable opaque layer comprises low overall glass transition temperature (Tg) polymers. A preferred polymer Tg range is −30° C. to 20° C.

Polymer binders are selected to form the permeable opaque layer that will not materially interfere with the permeation of the thermal diffusion of the colorants as they pass through the opaque layer to the polymer layer during transfer, whereupon the colorants bind to the polymer layer. An imaged layer may be provided on the substrate after transfer, with the imaged layer on top of the permeable opaque layer that provides background, and opposite the substrate from the permeable opaque layer. The substrate may be a dark color, such as black, navy blue or brown, without the dark color obscuring the color image, due to the lighter colored background provided by the opaque layer.

To produce a white or light opaque background, with a high white point for the display of high quality graphic images after heat transfer, cationic polymer compounds and crosslinking agents may be added to the formulation.

Example of Coating Composition of Permeable Opaque Layer:

| | |
|---|---|
| Triton X-100 nonionic surfactant | 0-10% |
| Eastman CP 349W chlorinated polyolefin | 0-20% |
| Dupont ™ Ti-Pure ® R960 titanium dioxide powder | 0-30% |
| Michem ® Wax 437 micronized polyolefin wax powder | 0-15% |
| Dow ® Ucar ™ AW-875 polyvinylchloride dispersion | 0-20% |
| Quab ® 151 aqueous dispersion | 0-20% |
| MelCross ™ 86 Resin | 0-25% |
| XAMA ® 7 aziridine crosslinking agent | 0-5% |
| Physical property modify Additives | 0-25% |
| Water | balance |

The optional inkjet or toner receptive layer 4 receives the image printed with thermally diffusible colorant inks or toners. The image receptive layer 4 comprises materials which receive and retain ink or toner as it is printed, either by physical entrapment or chemical reaction. This layer quickly absorbs ink drops from liquid inkjet ink, minimizing bleeding of the image, and maintaining a high definition of the image. In addition, the layer temporarily holds the thermally diffusible colorants from the ink or toner close to the surface of the transfer medium. Spreading of the ink drops is reduced, thereby improving image resolution, and providing a high optical density image. The image receptive layer may also act as a receiving surface for wax thermal inks, or electrophotographic printing toners. The image receptive layer may be tailored for use with any print method known in the art. For example, materials known in the art for forming inkjet or toner receptive paper coatings may be used according to appropriate applications.

Examples of materials that retain liquid through physical entrapment include, but are not limited to, porous materials such as silica gel, alumina, aluminum silicate, calcium silicate, magnesium silicate, zeolite, porous glass, diatomaceous earth, and vermiculite; liquid swellable materials such as montmorillonite type clays, such as bentonite and hectorite; and polysaccharides, such as starch, cationic starch, chitosan, grafted chitosan, dextrin, cyclodextrins, finely-divided organic pigments, such as polystyrene resin, ion exchange resin, urea resin, and melamine resin; and fillers, such as calcium carbonate, magnesium carbonate, kaolin, talc, titanium dioxide, zinc oxide, magnesium oxide, magnesium hydroxide, calcium hydroxide, and calcium sulfate. Examples of materials that retain liquid through chemical reaction include, but are not limited to, polymers based on methacrylate, acrylate, or the like; and monomers with suitable cross-linking agents such as divinylbenzene.

Water-soluble polymers, such as polyvinyl alcohol, modified polyvinyl alcohol, polyvinylpyrrolidinone, polyvinyl methyl ether, polyvinylbutyral, polyethylene imine, polyethylene oxide, cellulose derivatives, such as methyl cellulose, ethyl cellulose, methyl ethyl cellulose, hydroxypropyl cellulose, natural polymers, such as arabic gum, casein, gelatin, sodium alginate, and chitosin are typically used as binders. Water-insoluble polymers may be used as binders. Examples of such are styrene-butadiene copolymers, acrylic latexes, polyacrylamide, and polyvinyl acetate. The liquid retaining/receptive layer may contain chemicals which react irreversibly with water and/or solvents to render them non-volatile. An example is polyvinyl alcohol. Auxiliary agents may be included in the liquid retaining layer formulation such as ultraviolet absorber, thickener, dispersant, defoamer, optical brightening agent, pH buffer, colorant, wetting agent, and/or lubricant.

The image receptive layer comprised of the above mentioned liquid retaining compounds and binder may be prepared in any ratio using one or more of each of the above mentioned liquid retaining compounds and binders. In one embodiment 5-50% binder is combined with 50-95% liquid retaining compound. A preferred embodiment is 5-25% binder with 75-95% liquid retaining compound. The image receptive layer 4 may be applied to the permeation opaque layer 6 by any known coating procedure. The dry coat weight generally ranges from 1-40 g/m$^2$, and is preferably 2-20 g/m$^2$.

Example 3

Coating Composition of Image Receptive Layer

| | |
|---|---|
| Polyvinyl alcohol binder | 5-50% |
| Liquid retaining compound | 50-95% |
| Physical property modify additives | 0-25% |
| liquid carrier (water) | balance |

The transfer method does not require peeling imaged layers from a supporting base.

The present invention enables creation of a multiple-layer transfer medium with an opaque permeable layer, such as white pigmented layer, that masks the colored or dark substrate, such as a cotton fabric. Color images can be generated on the outer surface and over the white pigmented layer. The resulting image has a low hand, vivid color, high optical intensity and has flexibility and high light fastness properties, and the dark substrate does not obscure the image.

The present invention is able to achieve high fastness, and is resistant to fading from washing, perspiration and weathering, by using one or more permeable binder materials in the transfer medium, including reactive binder materials. Gross coverage of the transfer medium with the binder materials does not necessarily match the coverage of the image to be printed upon it. The material or materials are applied to the transfer medium over the general area to which the image layer formed by the inks is to be applied. To achieve sufficient coverage of the binder materials on the transfer medium, the area of the sheet that is covered with the surface coating material may be larger than the area that will be covered by the ink or toner that forms the image. The binder materials extend beyond the margins of the image after the image is printed on the substrate and are transferred to the final substrate.

The use of computer technology allows substantially instantaneous printing of images. For example, video cameras or scanners 30 may be used to capture a color image on a computer 20. Images created or stored on a computer may be printed on command, without regard to run size. The image may be printed onto the substrate from the computer by any suitable printing means 24 capable of printing in multiple colors, including mechanical thermal printers, ink jet printers and electrophotographic or electrostatic printers, and transferred, as described above.

Computers and digital printers are inexpensive, and transfers of photographs and computer generated images may be made to substrates such as ceramics, textiles, including T-shirts 16, and other articles. These transfers may be produced by end users at home, as well as commercial establishments. The image is transferred by the application of heat as described above. An iron for clothing, or a heat press 26 intended to accomplish such transfers, are examples of devices that may be used for heat transfer.

What is claimed is:

1. A transfer medium for applying an image formed over an opaque layer to a substrate, comprising:

a layer for which a diffusible colorant has an affinity upon diffusion of the diffusible colorant, and an opaque layer through which said diffusible colorant will pass when diffused, wherein the diffusible colorant has an affinity for the layer when said diffusible colorant is diffused by the application of heat and the diffusible colorant passes through the opaque layer to reach said layer.

2. A transfer medium for applying an image formed over an opaque layer to a substrate as described in claim 1, wherein the diffusible colorant comprises disperse dye.

3. A transfer medium for applying an image formed over an opaque layer to a substrate as described in claim 1, wherein the diffusible colorant comprises sublimation dye.

4. A transfer medium for applying an image formed over an opaque layer to a substrate as described in claim 1, wherein the opaque layer comprises an opacifying agent.

5. A transfer medium for applying an image formed over an opaque layer to a substrate as described in claim 1, wherein the opaque layer comprises titanium dioxide.

6. A transfer medium for applying an image formed over an opaque layer to a substrate as described in claim 1, wherein the diffusible colorant has no material affinity for the opaque layer.

7. A transfer medium for applying an image formed over an opaque layer to a substrate as described in claim 1, wherein the opaque layer comprises an opacifying agent and a polymer binder and the diffusible colorant has no material affinity for the opaque layer.

8. A transfer medium for applying an image formed over an opaque layer to a substrate as described in claim 1, wherein the layer to which the diffusible colorant has an affinity comprises a clear polymer layer.

9. A transfer medium for applying an image formed over an opaque layer to a substrate as described in claim 1, the transfer medium further comprising an image layer comprising said diffusible colorant, wherein said image layer is formed on said transfer medium over said opaque layer and opposite said layer to which the diffusible colorant has an affinity.

10. A transfer medium for applying an image formed over an opaque layer to a substrate as described in claim 9, wherein the opaque layer comprises titanium dioxide.

11. A transfer medium for applying an image formed over an opaque layer to a substrate as described in claim 1, further comprising an image receiving layer that is present over said opaque layer.

12. A transfer medium for applying an image formed over an opaque layer to a substrate as described in claim 1, further comprising an image receiving layer that is present over said opaque layer, wherein said image receiving layer comprises a liquid retaining compound.

13. A transfer medium for applying an image formed over an opaque layer to a substrate as described in claim 1, further comprising a base sheet that is opposite said opaque layer from said layer to which the diffusible colorant has an affinity.

14. A transfer medium for applying an image formed over an opaque layer to a substrate as described in claim 1, wherein the opaque layer comprises a white opacifying agent and a polymer binder, and the diffusible colorant has no material affinity for the opaque layer.

15. A transfer medium for applying an image formed over an opaque layer to a substrate as described in claim 1, wherein the opaque layer comprises a material that produces a gas when heat is applied to said opaque layer during image transfer.

* * * * *

US008029883C1

(12) EX PARTE REEXAMINATION CERTIFICATE (9203rd)

United States Patent

(10) Number: US 8,029,883 C1

(45) Certificate Issued: Aug. 14, 2012

Xu et al.

(54) IMAGE RECEIVER MEDIA AND PRINTING PROCESS

(76) Inventors: Ming Xu, Malvern, PA (US); Zhenrong Guo, Mt. Pleasant, SC (US); Sukun Zhang, Mt Pleasant, SC (US)

Reexamination Request:

No. 90/011,947, Oct. 6, 2011

Reexamination Certificate for:

| | |
|---|---|
| Patent No.: | **8,029,883** |
| Issued: | **Oct. 4, 2011** |
| Appl. No.: | **12/613,084** |
| Filed: | **Nov. 5, 2009** |

Related U.S. Application Data

(60) Provisional application No. 61/161,913, filed on Mar. 20, 2009, provisional application No. 61/120,175, filed on Dec. 5, 2008, and provisional application No. 61/117,752, filed on Nov. 25, 2008.

(51) Int. Cl.

| | |
|---|---|
| *B32B 3/00* | (2006.01) |
| *B32B 5/16* | (2006.01) |
| *B32B 7/00* | (2006.01) |

(52) U.S. Cl. .................... 428/206; 428/207; 428/211.1; 428/325; 428/688

(58) Field of Classification Search ........................ None
See application file for complete search history.

(56) References Cited

To view the complete listing of prior art documents cited during the proceeding for Reexamination Control Number 90/011,947, please refer to the USPTO's public Patent Application Information Retrieval (PAIR) system under the Display References tab.

*Primary Examiner*—Ling Xu

(57) ABSTRACT

A transfer medium is provided for receiving images formed on the medium by inks or toners comprising thermally diffusible colorants, including disperse dye and sublimation dye, and methods of using the medium to present images on substrates. The medium provides an opaque layer that allows transfer of the image from the medium to a substrate, and provides a background for the image when the image is transferred to a dark colored substrate, so that the dark colored substrate does not obscure the image.

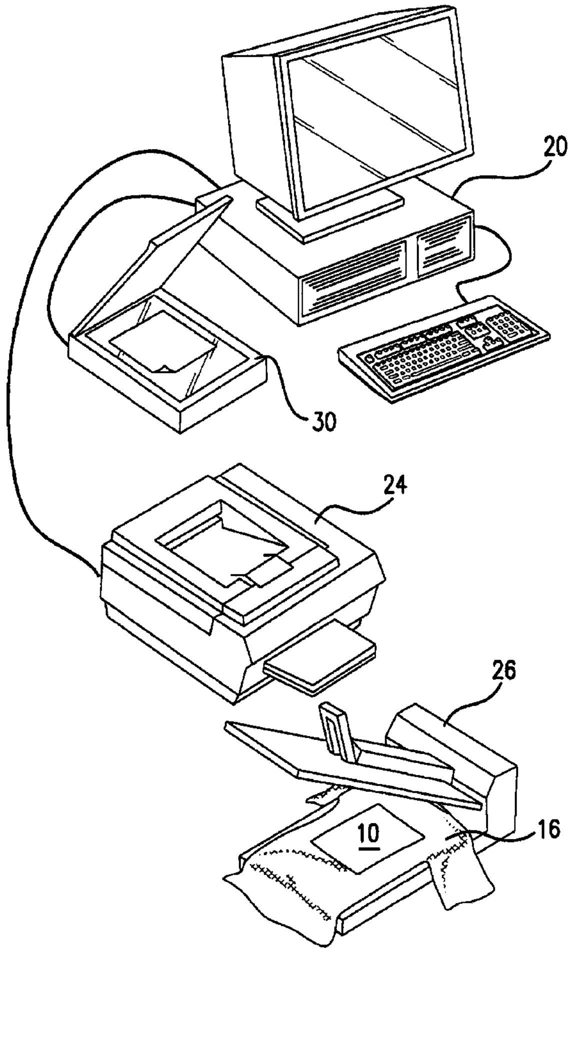

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 6-9 and 13 are determined to be patentable as amended.

Claims 4-5, 10-12 and 14-15 dependent on an amended claim, are determined to be patentable.

New claim 16 is added and determined to be patentable.

1. A transfer medium for applying an image formed over an opaque layer to a substrate, comprising:

*a heat releasing base sheet;* a layer for which a diffusible colorant has an affinity [upon diffusion of the diffusible colorant,]*;* and an opaque layer through which said diffusible colorant [will pass] *passes* when diffused[,]*;* wherein the *layer for which the* diffusible colorant has an affinity [for the layer when said diffusible colorant is diffused by the application of heat and] *and the opaque layer are released from the heat releasing base sheet upon application of heat to the transfer medium, and wherein, upon the application of the heat to the transfer medium,* the diffusible colorant passes through the opaque layer [to reach said layer] *and binds to the layer for which the* diffusible *colorant has an affinity*.

2. A transfer medium for applying an image formed over an opaque layer to a substrate as described in claim 1, *further comprising an image layer comprising a diffusible colorant, wherein the image layer is over the opaque layer, and* wherein the diffusible colorant comprises disperse dye.

3. A transfer medium for applying an image formed over an opaque layer to a substrate as described in claim 1, *further comprising an image layer comprising a diffusible colorant, wherein the image layer is over the opaque layer, and* wherein the diffusible colorant comprises sublimation dye.

6. A transfer medium for applying an image formed over an opaque layer to a substrate as described in claim 1, wherein the *opaque layer is an opaque layer for which the* diffusible colorant has no material affinity [for the opaque layer].

7. A transfer medium for applying an image formed over an opaque layer to a substrate as described in claim 1, wherein the opaque layer comprises an opacifying agent and a polymer binder and *the opaque layer is an opaque layer for which* the diffusible colorant has no material affinity [for the opaque layer].

8. A transfer medium for applying an image formed over an opaque layer to a substrate as described in claim 1, wherein the layer to which the diffusible colorant has an affinity comprises a clear polymer [layer].

9. A transfer medium for applying an image formed over an opaque layer to a substrate as described in claim 1, the transfer medium further comprising an image layer comprising [said] *a* diffusible colorant, wherein said image layer is formed on said transfer medium over said opaque layer and opposite said layer to which the diffusible colorant has an affinity.

13. A transfer medium for applying an image formed over an opaque layer to a substrate as described in claim 1, [further comprising a] *wherein the heat releasing* base sheet [that] is opposite said opaque layer from said layer to which the diffusible colorant has an affinity.

*16. A transfer medium for applying an image formed over an opaque layer to a substrate as described in claim 1, further comprising an image layer comprising a diffusible colorant, wherein the image layer is formed over the opaque layer, and wherein the opaque layer forms a background for the image layer upon heat transfer of the image layer, the layer for which the diffusible colorant has an affinity, and the opaque layer to a receiving substrate, wherein the background formed by the opaque layer is a color contrasting to a color of the receiving substrate.*

* * * * *